United States Patent [19]

Bratrud

[11] Patent Number: 5,003,926
[45] Date of Patent: Apr. 2, 1991

[54] CATTLE FEEDING TROUGH

[76] Inventor: Lyle A. Bratrud, R.R. #1, Bawlf, Alberta, Canada, T0B 0J0

[21] Appl. No.: 538,001

[22] Filed: Jun. 14, 1990

[30] Foreign Application Priority Data

Jun. 15, 1989 [CA] Canada .................................. 602938

[51] Int. Cl.⁵ .......................... A01K 5/00; A01K 7/00
[52] U.S. Cl. .............................. 119/62; 119/63
[58] Field of Search .............................. 119/61, 62, 63

[56] References Cited

U.S. PATENT DOCUMENTS

| 582,629 | 5/1897 | Farr | 119/63 |
|---|---|---|---|
| 1,067,377 | 7/1913 | Schisler | 119/61 |
| 1,293,972 | 2/1919 | Stockton | 119/63 |
| 2,517,865 | 8/1950 | Gilmour, Jr. | 119/63 |
| 2,709,988 | 6/1955 | Hatcher | 119/62 |
| 2,735,402 | 2/1956 | DeLorenzo | 119/61 |
| 2,995,110 | 8/1961 | Wiley | 119/61 |
| 3,052,215 | 9/1962 | Shold | 119/61 |

FOREIGN PATENT DOCUMENTS

| 449822 | 2/1925 | Fed. Rep. of Germany | 119/63 |
|---|---|---|---|
| 728 | 7/1977 | Fed. Rep. of Germany | 119/63 |

Primary Examiner—Paul J. Hirsch
Attorney, Agent, or Firm—Beveridge, DeGrandi & Weilacher

[57] ABSTRACT

A cattle feeding trough consisting of a frame having a pocket with underlying ribs to support a container and at least one substantially vertical support. A container is positioned in the container support pocket of the frame. The container has opposed end walls. Each of the end walls has a concave peripheral edge. A closure lid is pivotally mounted to the vertical support with the closure lid positioned over the container. The closure lid has opposed end walls. Each of the end walls has a convex peripheral edge. The convex end walls of the closure lid can be positioned in close proximity with the concave end walls of the container to protect the contents of the container from the weather while still permitting the closure lid to be pivotally moved aside by cattle seeking access to the contents of the container.

7 Claims, 4 Drawing Sheets

CATTLE FEEDING TROUGH

The present invention relates to a cattle feeding trough.

BACKGROUND OF THE INVENTION

Formerly "Salt Licks" were used to provide necessary dietary supplements to cattle. Salt Licks, as the name implies, are blocks of rock salt which were placed in the pasture for the cattle to lick. Presently, minerals are administered to cattle in granular form. A problem has been encountered when administering these minerals using existing cattle feeders. The minerals are being blown or washed away through exposure to the weather.

SUMMARY OF THE INVENTION

What is required is a form of cattle feeder which will protect the mineral contents from the elements.

According to the present invention there is provided a cattle feeding trough which is comprised of a container having opposed end walls. Each of the end walls has a concave peripheral edge. A support is secured to and extends substantially vertically from at least one of the end walls of the container. A closure lid is pivotally mounted to the vertical support whereby the closure lid is positioned over the container. The closure lid has opposed end walls. Each of the end walls has a convex peripheral edge. The convex peripheral edges of the closure lid end walls can be positioned in close proximity with the concave peripheral edges of the container end walls to protect the contents of the container from the weather while still permitting the closure lid to be pivotally moved aside by cattle seeking access to the contents of the container.

Although beneficial results may be obtained through the use of the cattle feeding trough described, the trough must be cleaned on a regular basis. The cleaning of the trough can be most readily accomplished if the container can be dumped. Even more beneficial results may therefore be obtained if the cattle feeding trough is comprised of a frame having means to support a container and at least one substantially vertical support. A container is positioned in the container support means of the frame. The container has opposed end walls. Each of the end walls has a concave peripheral edge. A closure lid is pivotally mounted to the vertical support whereby the closure lid is positioned over the container. The closure lid has opposed end walls. Each of the end walls has a convex peripheral edge such that the convex end walls of the closure lid can be positioned in close proximity with the concave end walls of the container to protect the contents of the container from the weather while still permitting the closure lid to be pivotally moved aside by cattle seeking access to the contents of the container.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
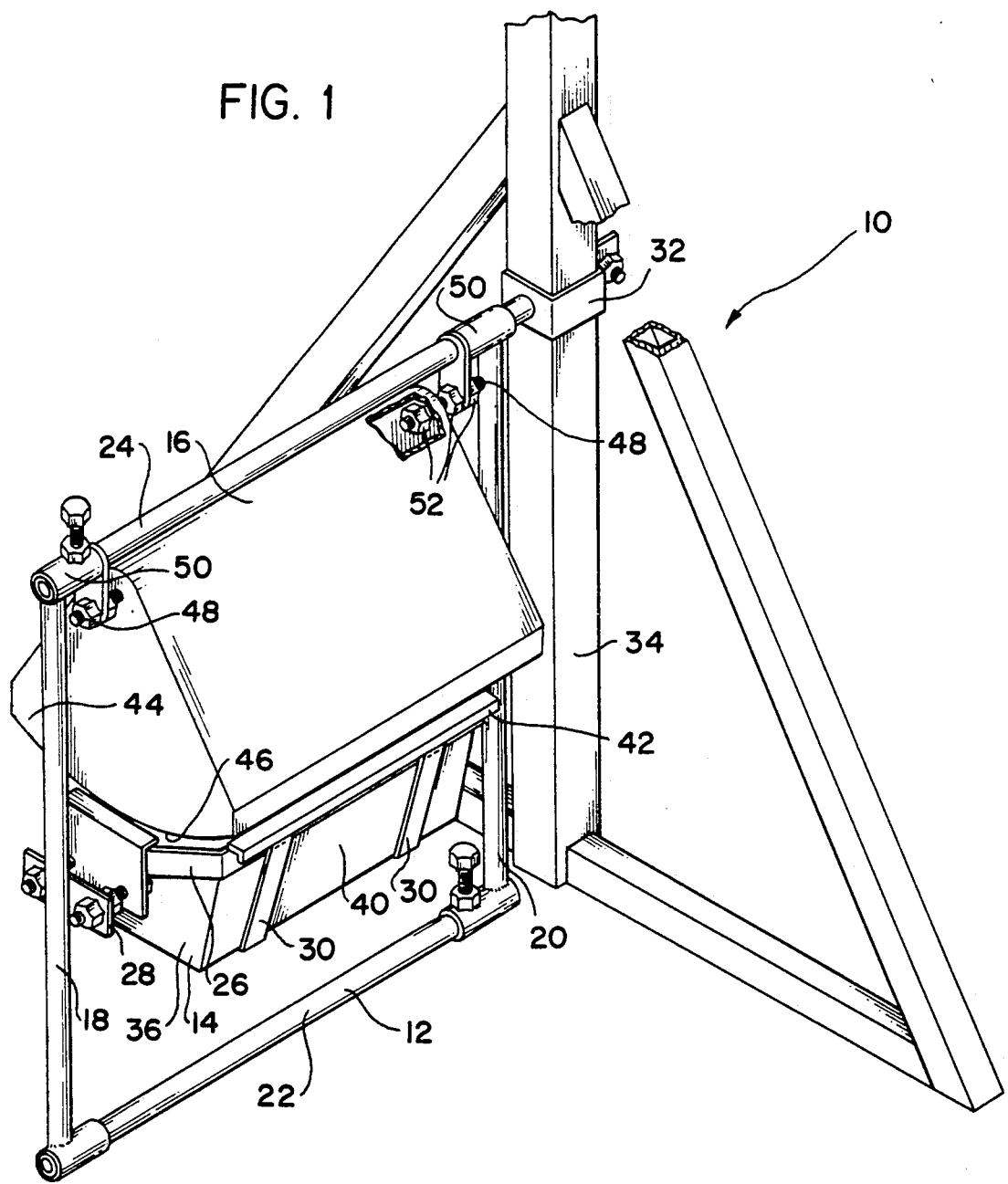
FIG. 1 is a partially cut away perspective view of a preferred embodiment of the invention.

The preferred embodiment will now be described with reference to FIGS. 1 through 4. The preferred embodiment, generally designated by reference numeral 10, is a cattle feeding trough.

Figure 2:
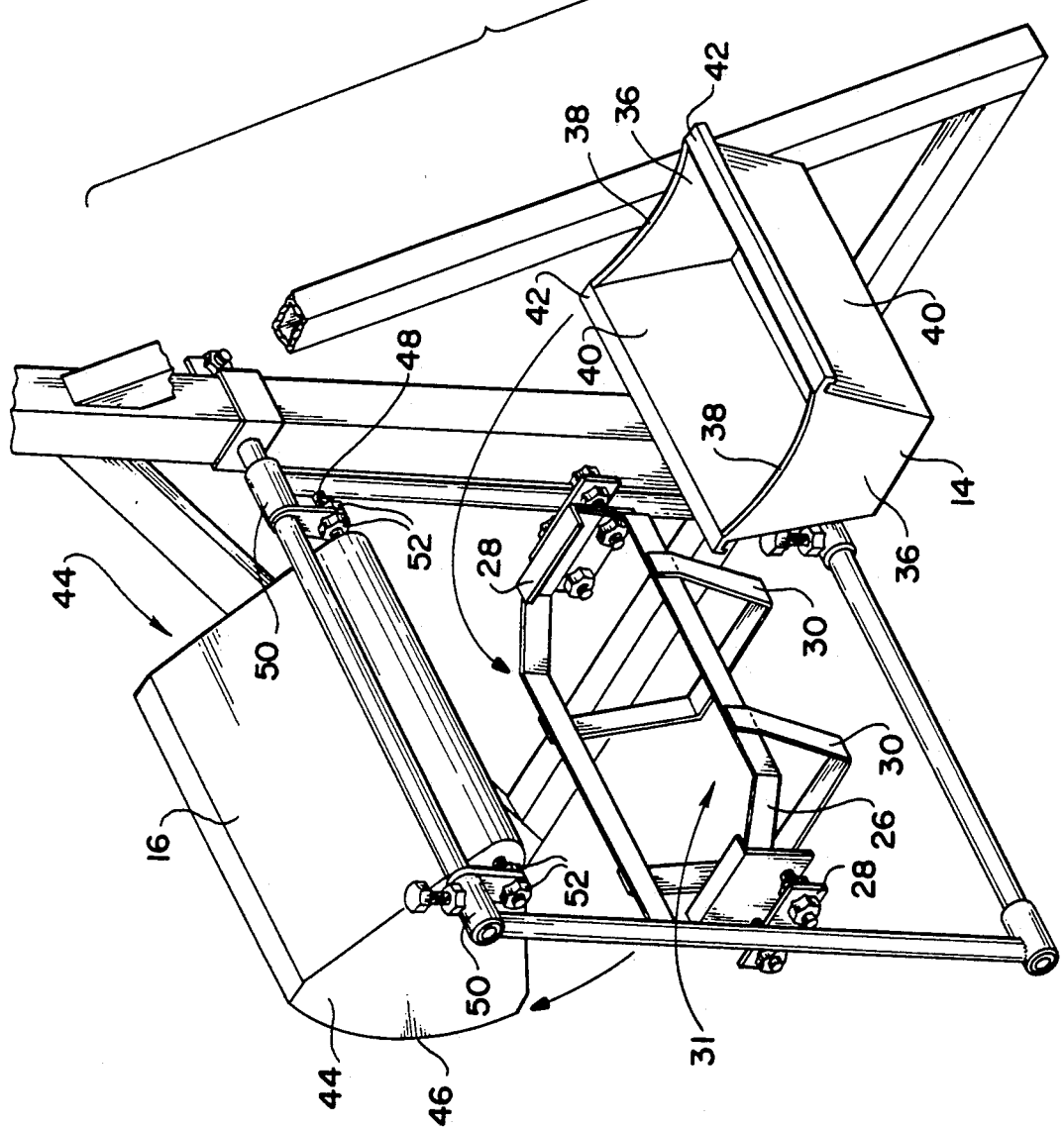
FIG. 2 is a perspective view with container removed of the cattle feeding trough illustrated in FIG. 1.
Figure 3:
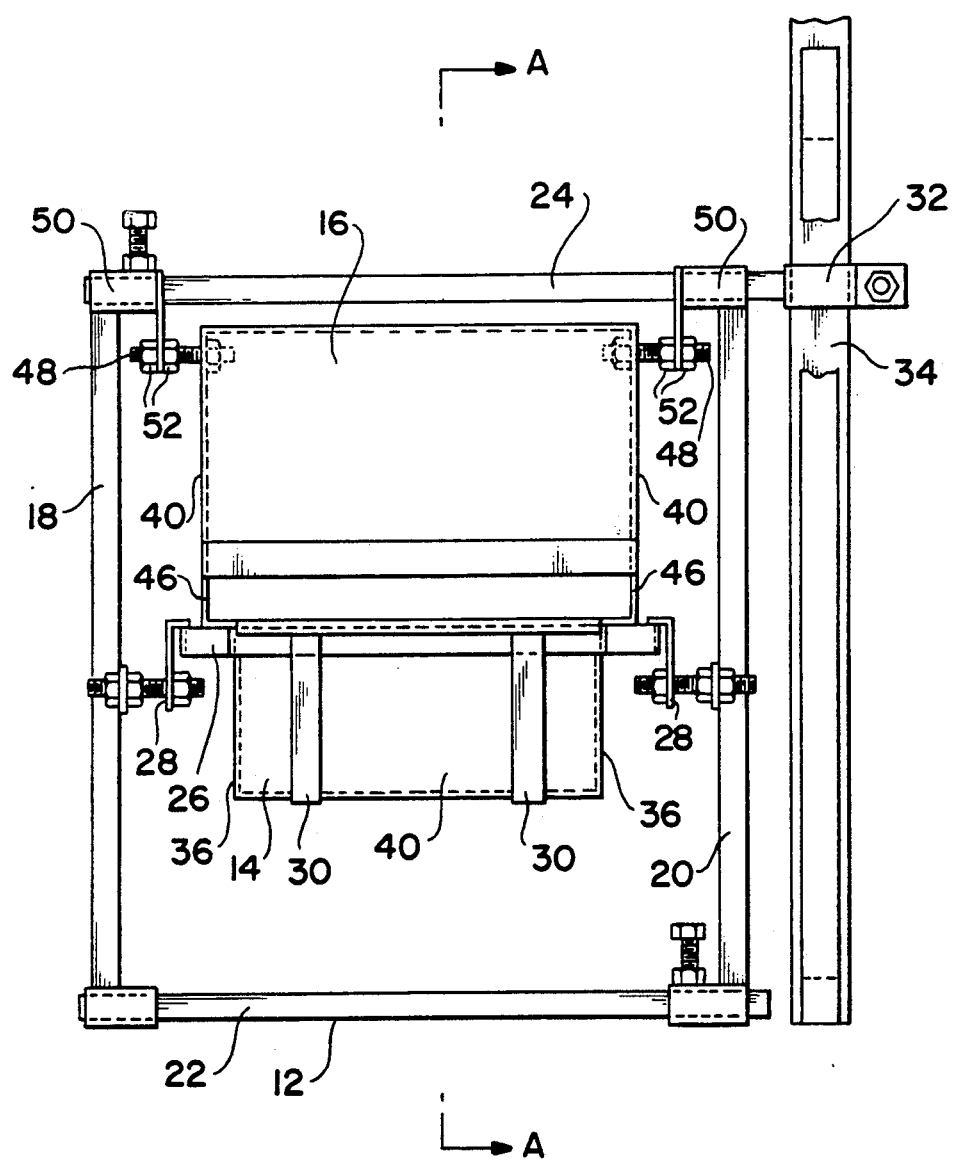
FIG. 3 is a side elevation view of the cattle feeding trough illustrated in FIG. 1.
Figure 4:
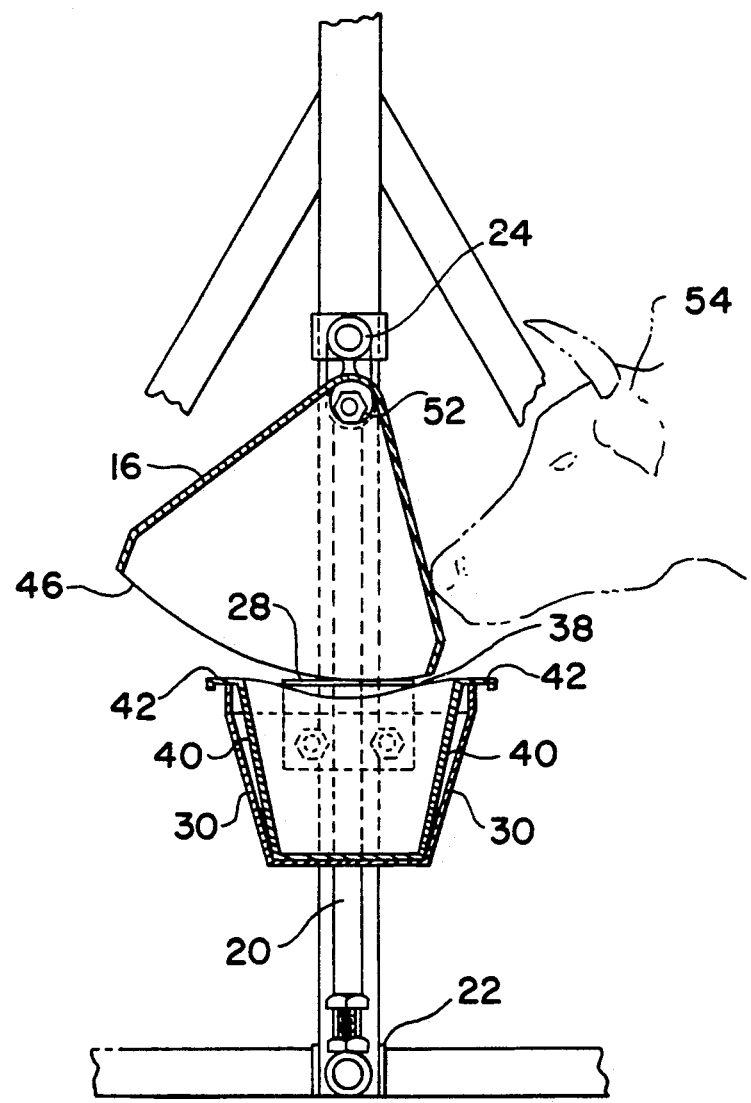
FIG. 4 is a section view taken along section lines A—A of FIG. 3.

The primary components of cattle feeding trough 10 are a frame 12, a container 14 and a closure lid 16. Referring to FIG. 3, frame 12 consists of two vertical support members 18 and 20 secured against transverse movement by two horizontal support members 22 and 24. Also part of frame 12 is a generally oval band 26 which is secured by means of clamps 28 between vertical supports 18 and 20. Extending across band 26 are two "U" shaped transverse ribs 30 which form a pocket 31. Attached to horizontal support 24 is a clamp 32, whereby frame 12 of cattle feeding trough 10 may be secured to a post 34. In FIGS. 1 through 4, post 34 is part of a cattle delicing apparatus (not shown). Container 14 is positioned in container support pocket 31 of frame 12. Referring to FIG. 2, container 14 has opposed end walls 36. Each of end walls 36 has a concave peripheral edge 38. Container 14 has opposed side walls 40. Side walls 40 have a peripheral flange 42. Closure lid 16 is pivotally mounted between vertical supports 18 and 20, whereby closure lid 16 is positioned over container 14. Closure lid 16 is triangular in cross-section and has opposed end walls 44. Each of end walls 44 has a convex peripheral edge 46. A threaded shaft 48 extends through end walls 44 of closure lid 16 to pivotally mount closure lid 16 to a bracket 50 on each of vertical supports 18 and 20. Threaded shafts 48 are maintained in position by a nuts 52.

In order to use cattle feeding trough 10, frame 12 is mounted by means of clamp 32 to post 34. Minerals in granular form are then placed in container 14. The triangular cross-section of closure lid 16 assists in keeping rain out of container 16. Convex peripheral edges 46 of closure lid end walls 44 are in close proximity with concave peripheral edges 38 of container end walls 36 and therefore protect the contents of container 14 from exposure to the wind. However referring to FIG. 4, closure lid 16 may be pivotally moved aside by cattle 54 seeking access to the contents of container 14. Referring to FIG. 2, when it is desired to clean container 14, closure lid 16 is pivoted to one side and container 14 may be removed and dumped. Closure lid 16 is then placed back into position in container support pocket 31. When correctly in position in container support pocket 31 container 14 rests upon ribs 30, and peripheral flanges 42 engage band 26 of frame 12.

The Applicant has determined that cattle need to be trained on how to use cattle feeding trough 10. The Applicant recommends that for the first week closure lid 16 be propped partially open. This will permit the cattle to gain access to the contents of container 14. The cattle will soon discover that closure lid 16 will pivotally move out of the way. In approximately 1 weeks time when closure lid 16 is no longer propped partially open, the cattle will continue to push closure lid 16 out of the way to gain access to the contents of container 14.

It will be apparent to one skilled in the art that modifications may be made without departing from the spirit and scope of the invention. Container 14 may be made in a number of shapes and sizes as long as the shape is selected to ensure that there are no projections on the side wall which will prevent the pivotal movement of closure lid 16. Although it is preferred that closure lid 16 be triangular in cross-section, a rectangular closure lid would be serviceable. Although it would be preferred that container 14 be removable, a fixed container would be serviceable.

The embodiments of the invention in which an exclusive property or privilege is claimed are defined as follows:

1. A cattle feeding trough, comprising:
    a. a frame having means to support a container and at least one substantially vertical support;
    b. a container positioned in the container support means of the frame, the container having opposed end walls, each of the end walls having a concave peripheral edge; and
    c. a closure lid pivotally mounted to the vertical support whereby the closure lid is positioned over the container, the closure lid having opposed end walls, each of the end walls having a convex peripheral edge such that the convex peripheral edges of the closure lid end walls can be positioned in close proximity with the concave peripheral edges of the container end walls to protect the contents of the container from the weather while still permitting the closure lid to be pivotally moved aside by cattle seeking access to the contents of the container.

2. A cattle feeding trough as defined in claim 1, the container support means being a pocket with underlying support ribs.

3. A cattle feeding trough as defined in claim 1, the closure lid being triangular in cross-section.

4. A cattle feeding trough as defined in claim 1, the container having opposed side walls with peripheral flanges which engage the frame.

5. A cattle feeding trough as defined in claim 1, having two vertical supports with the closure lid pivotally secured therebetween.

6. A cattle feeding trough, comprising:
    a. a container having opposed end walls, each of the end walls having a concave peripheral edge;
    b. a support secured to and extending substantially vertically from at least one of the end walls of the container; and
    c. a closure lid pivotally mounted to the vertical support whereby the closure lid is positioned over the container, the closure lid having opposed end walls, each of the end walls having a convex peripheral edge such that the convex peripheral edges of the closure lid end walls can be positioned in close proximity with the concave peripheral edges of the container end walls to protect the contents of the container from the weather while still permitting the closure lid to be pivotally moved aside by cattle seeking access to the contents of the container.

7. A cattle feeding trough, comprising:
    a. a frame having a pocket with underlying ribs to support a container and two substantially vertical supports;
    b. a container positioned in the container support pocket of the frame, the container having opposed end walls, each of the end walls having a concave peripheral edge, the container having opposed side walls a with peripheral flange which engages the frame; and
    c. a closure lid pivotally mounted between the vertical supports whereby the closure lid is positioned over the container, the closure lid being triangular in cross-section and having opposed end walls, each of the end walls having a convex peripheral edge such that the convex peripheral edges of the closure lid end walls can be positioned in close proximity with the concave peripheral edges of the container end walls to protect the contents of the container from the weather while still permitting the closure lid to be pivotally moved aside by cattle seeking access to the contents of the container.

* * * * *